United States Patent [19]
Powell

[11] Patent Number: 4,492,895
[45] Date of Patent: Jan. 8, 1985

[54] ARC RESISTANT HALOGEN HEADLAMP AND WIRING SCHEME THEREFOR

[75] Inventor: Robert A. Powell, Cookeville, Tenn.

[73] Assignee: Edison International, Inc., Rolling Meadows, Ill.

[21] Appl. No.: 422,005

[22] Filed: Sep. 23, 1982

[51] Int. Cl.[3] .......... B60Q 1/02
[52] U.S. Cl. .......... 315/82; 313/113; 315/83; 340/76
[58] Field of Search .......... 315/82, 83; 340/76; 313/113

[56] References Cited

U.S. PATENT DOCUMENTS

| | | | |
|---|---|---|---|
| 3,139,555 | 6/1964 | Paule et al. | 315/83 X |
| 3,609,681 | 9/1971 | Saul | 315/83 |
| 3,784,975 | 1/1974 | Ward | 315/83 |
| 4,319,156 | 3/1982 | Bienvenue et al. | 313/113 |
| 4,363,994 | 12/1982 | Cortorillo et al. | 313/113 |

*Primary Examiner*—Saxfield Chatmon

*Attorney, Agent, or Firm*—Thomas G. Anderson; Jon Carl Gealow; Hugh M. Gilroy

[57] ABSTRACT

An incandescent lamp for use in the headlamp of an automotive vehicle includes a low beam and a high beam filament mounted in a gas-filled, sealed envelope. The filaments are generally parallel, in closely adjacent, overlapping physical relation and each filament includes first and second similarly positioned ends. The lamp is electrically connected to the positive and negative terminals of the vehicle battery via a switch for energizing the high beam filament momentarily in a "flash to pass" mode while the low beam filament remains energized. The filaments are wired with the first end of the low beam filament and second end of the high beam filament being connected to the negative terminal of the battery and the first end of the high beam filament and second end of the low beam filament connected to the positive terminal of the battery to avoid arcing between filaments which occurs in prior art lamps of this type during initial operation of the low beam filament and "flash to pass" operation of the high beam filament.

4 Claims, 4 Drawing Figures

ARC RESISTANT HALOGEN HEADLAMP AND WIRING SCHEME THEREFOR

BACKGROUND OF THE INVENTION

This invention relates generally to automotive or the like headlamps, especially of the halogen type, which include a lamp having both "low" and "high" beam filaments and more particularly to a wiring scheme therefor.

With the change from a foot-operated, floor button switch to a hand operated, steering column lever, switch for operating the high beams in American-built automotive vehicle headlamp systems, a "flash to pass" feature was also easily incorporated therein. The "flash to pass" feature, which has been provided in European and Japanese made automotive vehicles for some time, enables the driver to momentarily operate the headlamp high beam while continuing to operate the headlamp low beam. This "flashing" of the high beam is used primarily to indicate to a driver ahead that one wishes to pass.

It has been found that under certain conditions in commercially available dual beam headlamps, especially those of the halogen type, operation of the headlamps in a "flash to pass" mode can result in the production of an electric arc within the lamp envelope between the high and low beam filaments, which in turn can cause destruction of the low beam filament.

The dual beam headlamps in which the latter has been found to occur are constructed so that the high and low beam lamp filaments are closely adjacent and overlap each other with the central section of the high beam filament normally being aligned with the positive terminal of the low beam filament. The lamp is wired so that the same physical ends of both the high and low beam filaments are connected electrically to the negative terminal of a conventional 12-volt battery of the automotive vehicle.

It has been found that in headlamps of the type described, if the low beam lamp filament has been energized for more than 0.25 seconds but less than 1 minute and the "flash to pass" lever is operated in a rather rapid motion, arcing between filaments is likely to occur with possible damage to the low beam lamp filament resulting.

It has been discovered that the time between 0.25 seconds and 1 minute after the energization of the low beam filament of the lamp is critical because of the decreased pressure of the gas within the lamp envelope. At this time, the gas in the lamp envelope is at a pressure which is especially conducive to the establishment of electrical arcs therethrough.

SUMMARY OF THE INVENTION

Accordingly, it is a primary object of the present invention to provide a wiring scheme for a dual-filament lamp, especially of the halogen type, for use in a vehicle headlamp, which avoids the aforementioned drawbacks when operated in a "flash to pass" mode.

It is another object of the present invention to provide a simple, yet effective means for correcting the arcing which may occur in presently available dual-filament headlamps, especially of the halogen type, during "flash to pass" operation thereof.

It is yet another object of the present invention to provide a new and improved dual-filament lamp for use in a headlamp of an automotive or the like vehicle, the filaments of which are arranged for electrical wiring to avoid arcing which may occur in presently available, dual-filament lamps during "flash to pass" operation.

Briefly, a preferred embodiment of the subject invention comprises a dual beam vehicle headlamp including a lamp in which the high and low beam filaments are positioned in generally parallel, closely adjacent alignment with a central section of the high beam filament aligned with an end terminal of the low beam filament. The extreme outer ends of each of the filaments are connected to the positive side of the vehicle battery, while the opposite ends of the filaments are connected to the negative side of the battery, respectively.

In the wiring scheme cf the dual-filament lamp according to the invention, operation of the "flash to pass" lever produces only an insignificant voltage drop; i.e. a 6 volt drop in a 12 volt system, between the filaments. This voltage drop is considerably less than the full 12 volt drop in presently available dual-filament automotive headlamps and as such it is unlikely that an electrical arc between the filaments will occur.

DETAILED DESCRIPTION OF THE DRAWING

Figure 1:
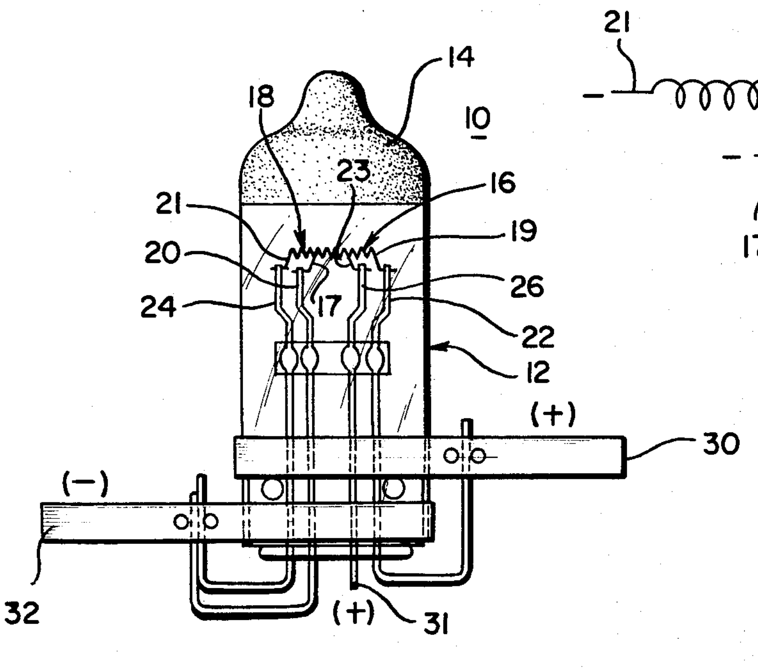
FIG. 1 PRIOR ART
FIG. 1 is a side view of a prior art, dual-filament lamp for use in a headlamp of an automotive or the like vehicle.

Referring now to the drawing in greater detail, there is illustrated in FIG. 1, a dual-filament incandescent halogen lamp 10 of a type presently used in headlamps of automotive vehicles.

Lamp 10 is of a conventional design including an outer, sealed glass envelope 12 having therein a gaseous atmosphere of Krypton with a halogen additive. The upper end 14 of the glass envelope of the lamp is coated with an opaque material to prevent light from the lamp from being directed outwardly at the top of the lamp envelope.

Mounted within envelope 12 are two, closely adjacent, generally parallel aligned, partially overlapping or offset lamp filaments 16, 18. One filament, 16, comprises the lamp "high" beam and the other filament, 18, comprises the lamp "low" beam. The distance between the filaments is generally about one millimeter, but can vary between 0.5 and 1.75 millimeters.

Filaments 16, 18 are supported at opposite ends 17, 19 and 21, 23, between spaced electrodes 20, 22 and 24, 26, respectively. The electrodes extend outwardly of the lamp envelope at the bottom 28 thereof. Envelope 12 is sealed about the free ends of the electrodes to entrap the gaseous atmosphere of the lamp in the envelope.

A pair of support straps 30, 32, joined to glass envelope 12 near end 28 thereof, is provided for mounting the lamp on the reflector of an automobile headlamp housing (not shown) and for electrically connecting certain of the filament electrodes to terminals (not shown) on the headlamp housing used to make electrical connection with the vehicle power source or battery.

In the case of the electrodes of the lamp of FIG. 1, three, 20, 22, and 24, are bent for connection to support straps 30, 32; i.e. electrode 22 is coupled to strap 30 and electrodes 20, 24 are coupled to strap 32. A fourth lamp electrode 26 is coupled at its free end 31, directly to a third terminal (not shown), on the headlamp housing. It is standard practice in the automotive lighting industry to provide three external headlamp terminals on a headlamp housing for connection in the vehicle circuit to the vehicle battery.

Figure 2:
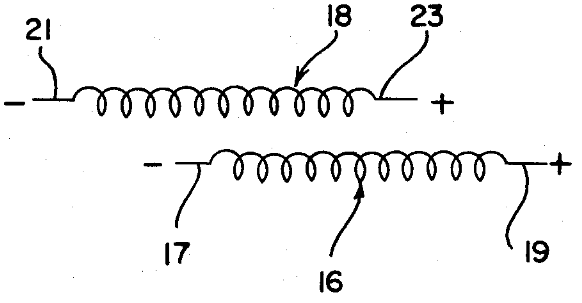
FIG. 2 PRIOR ART
FIG. 2 is an electrical wiring schematic of the filaments of the prior art lamp of FIG. 1.

Electrical connection to the filaments of lamp 10 are shown schematically in FIG. 2 of the drawing. As illustrated, like ends 19, 23 of filaments 16, 18 are connected to the positive or 12-volt side of the vehicle battery. Opposite ends 17, 21 of filaments 16, 18, respectively, are connected to the negative, or grounded side of the vehicle battery.

In the case of prior art lamp 10, connected electrically to the vehicle battery as illustrated in FIG. 2, during the time interval between 0.25 minutes and 1 minute of energization of "low" beam filament 18 of lamp 10, insufficient heating of the gas within envelope 12 has taken place. Thus, the pressure of the gaseous atmosphere within envelope 12 has not yet reached its full operating level. At this time, the gaseous atmosphere is especially susceptible to supporting an electrical arc. This is even more prevalent in the case of halogen type lamps which tend to produce more heat when energized fully.

During this period, if the "high" beam filament should be energized in a "flash to pass" mode upon release of the "flash to pass" switch, current passing through "high" beam filament 16 during the momentary energization thereof, is removed and an excess of electrons remains along filament 16. Electrons being negatively charged, seek a positively charged point toward which to travel. Because of the positioning of the filaments in close proximity to each other in the overlapping manner described and shown in FIG. 2, the nearest positively charged point is the positive end 23 of "low" beam filament 18. Because the positively connected end 23 of filament 18 is at full battery potential; i.e. 12 volts, a relatively large voltage differential is created between filaments 16 and 18, and the electrons on filament 16 are more likely to arc to the relatively high potential at end 23 of filament 18. Accordingly, the electrons gathered along filament 16 "jump" in the form of an electrical arc from filament 16 to filament 18 at end 23 of filament 18. As a result, the portion of filament 18 nearest end 23, burns more brightly, momentarily heating up beyond the heat capacity of the filament and becomes severed, thereby destroying the "low" beam filament of the lamp.

In order to avoid the aforementioned difficulty and destruction of a dual filament lamp, such as lamp 10, the wiring scheme according to the invention has been provided.

Figure 3:
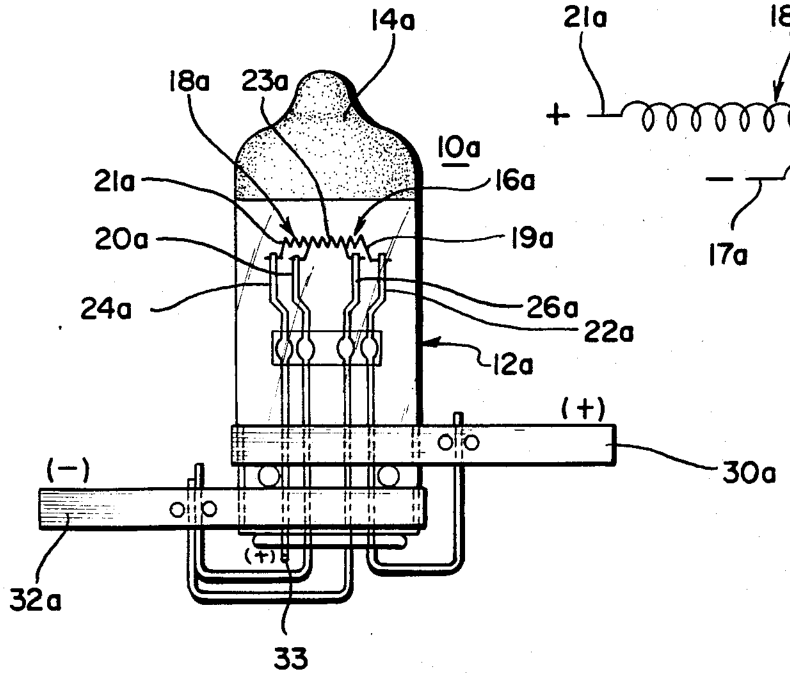
FIG. 3 is a side view of a dual-filament lamp for use in a headlamp of an automotive or the like vehicle constructed according to the invention.

Referring now to FIG. 3 of the drawing, a halogen lamp **10*a* of the same type as lamp 10 of FIG. 1, is shown. Lamp 10*a* includes a "high" beam filament 16*a* and a "low" beam filament 18*a*, positioned within glass filled envelope 12*a* in the same manner as filaments 16 and 18 of lamp 10 of FIG. 1**.

As in the case of lamp 10, electrodes **20*a*, 22*a* and 24*a*, 26*a*, are joined to and support filaments 16, 18, at end 17*a*, 19*a* and 21*a*, 23*a*, respectively. The free ends of the electrodes are also connected to support straps 30*a*, 32*a*** which mechanically support the lamp in a headlamp housing (not shown) as well as connect certain of the filaments electrically to headlamp housing terminals (not shown).

In the case of lamp **10*a* of FIG. 3, electrodes 20*a*, 26*a* at opposite ends of filaments 16*a*, 18*a*, respectively, are connected directly to support strap 32*a* which in turn is connected through a headlamp terminal (not shown) to the negative or grounded side of the vehicle battery. Electrode 22*a*, connected to end 19*a* of filament 16*a* nearest end 23*a* of filament 18*a*, is connected to the other support strap 30*a*. Strap 30*a* is connected through a second headlamp terminal (not shown) to the positive or 12 volt side of the vehicle battery. Electrode 24*a* of "low" beam filament 18*a*, is also connected to the positive side of the vehicle battery, but independently of strap 30*a*, at free end 33** via a third headlamp housing terminal (not shown).

Figure 4:
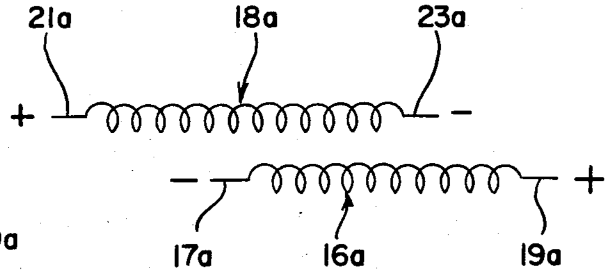
FIG. 4 is an electrical wiring schematic of the filaments of the lamp of FIG. 3 according to the invention.

Connected electrically as described in schematic form in FIG. 4 of the drawing, lamp **10*a* avoids "low" beam filament destruction caused by arcing during the "flash to pass" operation of "high" beam filament 16*a***.

In operation, subsequent to the momentary energization of "high" beam filament **16*a*, after the energization of "low" beam filament 18*a* and during the critical period discussed heretofore, current through "high" beam filament 16*a* ceases to flow. When this occurs, the excess of electrons discussed heretofore, remains on filament 16*a*. In this case, however, because there is no closely adjacent electrically positive point toward which such electrons can travel and since the nearest point to electron saturated filament 16*a*, is the negatively charged end 26*a* of filament 18*a*, repulsion of the electrons is most likely to occur. Furthermore, when connected as shown in FIG. 4, the greatest voltage differential between filaments 16*a* and 18*a* is only 6 volts. Such voltage differential is not likely to support an electrical arc through the gaseous atmosphere within envelope 12*a*** as in the case of the prior art wiring arrangement.

Because of the provision of the wiring scheme of lamp **10*a* shown in FIGS. 3 and 4**, arcing during the critical period of energization of the "high" beam lamp during a "flash to pass" operation thereof, is virtually eliminated.

While a particular embodiment of the invention has been shown and described, it should be understood that the invention is not limited thereto since modifications thereof may be made. It is therefor contemplated to cover by the present application any and all such modifications as fall within the true spirit and scope of the appended claims.

I claim:

1. An incandescent lamp for use in a headlamp of an automotive vehicle, said lamp being of the dual-filament type having a first, low beam filament and a second, high beam filament, said lamp being connected electrically to the positive and negative terminals of the vehicle battery through means for energizing said high beam filament momentarily in a "flash to pass" mode while said low beam filament is energized, said first, low and second, high beam filaments being mounted in a gas-filled, sealed envelope in generally parallel, closely adjacent, overlapping physical relationship, each said filament including first and second ends with the first and second ends of said low beam filament being at the same ends of said filaments as the first and second ends of said high beam filament, respectively, a central portion of said high beam filament being aligned generally with said first end of said low beam filament, said first end of said low beam filament and the second end of said high beam filament being connected to the negative terminal of said vehicle battery and the first end of said high beam filament and the second end of said low beam filament being connected to the positive terminal of said vehicle battery in a fashion essentially minimizing the potential difference between the overlapping portions of the filaments subsequent to the momentary energization of the high beam filament during said "flash to pass" mode, whereby upon operating said high beam filament in said "flash to pass" mode, arcing between said filaments is avoided.

2. An incandescent lamp as claimed in claim 1 wherein the distance between said first, low beam filament and said second, high beam filament within said sealed envelope is in the range of 0.5–1.75 millimeters.

3. An incandescent lamp as claimed in claim 1 further including first, second, third and fourth electrodes, said first and second electrodes being connected at first ends to the first and second ends, respectively, of said low beam filament and said third and fourth electrodes being connected at first ends to the first and second ends, respectively, of said high beam filament, the second ends of said electrodes extending outwardly of said envelope, said lamp further including mounting straps joined mechanically to said lamp envelope and extending outwardly in opposite directions therefrom, a first one of said mounting straps being coupled electrically to said negative terminal of said battery and the second one of said mounting straps being coupled electrically to said positive terminal of said battery, the second end of said first electrode and the second end of said fourth electrode being connected to said first one of said mounting straps, the first end of said third electrode being connected to said second one of said mounting straps and the second end of said second electrode being coupled electrically to the positive terminal of said battery.

4. An incandescent lamp as claimed in claim 1, wherein said negative and positive terminals of the vehicle battery to which said lamp is electrically connected are at ground and 12 volt potentials, respectively, and wherein the voltage drop between said high beam filament and said first end of said low beam filament during the operation of said high beam filament in a "flash to pass" mode is approximately 6 volts.

* * * * *